Patented Oct. 9, 1945

2,386,443

UNITED STATES PATENT OFFICE 2,386,443

SOFTENING OF RUBBER AND OF SYNTHETIC RUBBERLIKE SUBSTANCES

Arnold R. Davis, Riverside, Conn., assignor to American Cyanamid Company, New York, N. Y., a corporation of Maine No Drawing. Application September 25, 1941, Serial No. 412,286

15 Claims. (Cl. 260—36)

This invention relates to the softening of natural and synthetic rubber-like masses and is more particularly concerned with copolymers of 1,3-butadiene and acrylonitrile and to the softened products.

Synthetic rubber-like masses of the type with which the present invention is especially concerned are exemplified by those sold under the trade names of Perbunan and Hycar O. R. which are essentially copolymers of 1,3-butadiene and acrylonitrile. These synthetic rubbers may be vulcanized with sulfur in somewhat the same manner as can natural rubber, but unlike the latter, are much more difficult to process or work mechanically, being tough and hard to work even after prolonged milling.

It is an object of this invention, therefore, to provide a process for softening synthetic rubber-like masses containing rubber-like copolymerization products of 1,3-butadiene and acrylonitrile, so that they are more easily processed or worked mechanically, e. g., milled, calendered, extruded, etc.

According to my invention this and other objects may be accomplished by mixing with the rubber-like masses a phthalic acid mixed ester of the general formula:

$$R[XY]_n$$

wherein R is a residue of a member of the group consisting of alkylene glycols containing from 2–4 carbon atoms, polyalkylene glycols containing from 4–8 carbon atoms and glycerol, X is the residue of phthalic acid, Y is an alkyl group containing not more than 8 carbon atoms and $n$ represents the integers 2 and 3.

In the above formula R may be the radical of ethylene, propylene or butylene glycol or of diethylene, dipropylene or dibutylene glycol or of trimethylene, tetramethylene or triethylene glycol. Where R is the residue of any of these dihydric alcohols, X represents the residue of each of two molecules of phthalic acid, one carboxyl group of each molecule of phthalic acid being esterified with one hydroxy group of the glycol or polyalkylene glycol. Where R is the radical of the trihydric alcohol, glycerol, X represents the residue of each of three molecules of phthalic acid, one carboxyl group of each molecule of phthalic acid being esterified with one hydroxyl group of the glycerol.

The alkyl group Y, on the remaining carboxyl group of each molecule of phthalic acid, in either of the foregoing instances, may be the branched or unbranched hydrocarbon residue of a primary, secondary or tertiary aliphatic alcohol, providing the number of the carbon atoms thereof is that noted above. For example, the alkyl ester group may be methyl, ethyl, propyl, butyl, amyl or hexyl or the branched chain alkyl group of an 8 carbon atom secondary alcohol, such as 2-ethyl hexyl alcohol. Like or dissimilar alkyl ester groups of the class described may be attached to these carboxyl groups of the phthalic acid molecules. Preferably the alkyl groups have 4 to 5 carbon atoms, a preferred alkyl group being n-butyl.

Illustrative of compounds coming within the above general formula are the dibutyl esters of the ethylene and butylene glycol diphthalates and of diethylene and dibutylene glycol diphthalates and the tributyl ester of glycerol triphthalate, all of which are liquids of relatively high boiling point.

In the practice of the invention a phthalic acid ester of the class defined above is mixed with the synthetic rubber-like mass during the milling or breaking-down period, e. g., on the mill rolls. The amount of the phthalic acid ester softening agent employed may be varied and in general will be governed by the particular softening agent selected, the degree of toughness of the synthetic rubber-like mass and the extent to which softening of the latter is desired. In general, the amount may be from about 5% or less to about 50% based on the weight of the synthetic rubber-like mass.

The invention is illustrated by the following specific examples to which, however, it is not intended that the invention be limited, parts being by weight.

Example 1

A 300 gram sample of Hycar O. R. synthetic rubber was milled for one minute. With continued milling there was added slowly thereto 30 grams of the liquid ester, dibutyl ester of ethylene glycol diphthalate (dibutyl glycol diphthalate). The mill rolls were maintained at about 50° C. throughout a 10 minute milling period. This procedure was repeated with a further 300 grams of Hycar O. R. and 30 grams of the liquid ester, tributyl ester of glycerol triphthalate. A control of 300 grams of the copolymer was milled under similar conditions of temperature and for the same period of time.

The milled samples were then tested in a Williams plastometer for effectiveness of the phthalic acid esters as plasticizers for the copolymer rubber. A 3 minute "Y" value in inches at 100° C. was employed for the tests. The decrease in "Y"

value for the samples containing the phthalic acid esters indicates softening of the copolymer therewith. The results obtained are as follows:

| Plasticizer | "Y" value in inches |
| --- | --- |
| Control | .188 |
| Dibutyl glycol diphthalate | .164 |
| Tributyl glycerol triphthalate | .160 |

It is apparent from the above results that these phthalic acid esters are effective plasticizers for rubber-like copolymers of the 1,3-butadiene-acrylonitrile type.

A portion of each of the plasticized rubber-like copolymers were mixed with sulfur, carbon black, zinc oxide and a combination accelerator and vulcanized in the conventional manner. The rubber-like, flexible vulcanizates had good physical properties.

*Example 2*

Following the procedure of Example 1, the liquid esters, dibutyl ester of butylene glycol diphthalate and dibutyl ester of diethylene glycol diphthalate were tested in Hycar O. R. as softening agents for rubber-like copolymers of 1,3-butadiene and acrylonitrile. The results of the tests in the Williams plastometer are as follows:

| Plasticizer | "Y" value in inches |
| --- | --- |
| Control | .186 |
| Dibutyl butylene glycol diphthalate | .163 |
| Dibutyl diethylene glycol diphthalate | .169 |

The above tests showed these additional representatives of the softening agents of my invention to also be effective plasticizers of rubber-like 1,3-butadiene-acrylonitrile copolymers.

In general, synthetic rubber-like materials obtainable by copolymerizing conjugated diene hydrocarbons such as 1,3-butadiene, 1,3- and 1,4-pentadiene, isoprene, or chloroprene, with polymerizable substances such as acrylonitrile, polystyrene, isobutylene, cyano-butadienes such as 1 and 2 cyanobutadiene, esters of acrylic acid such as methyl acrylate and ethyl acrylate and esters of substituted acrylic acids such as methyl methacrylate, ethyl methacrylate, butyl methacrylate, isoamyl ethacrylate, etc., may be softened by milling with one of the phthalic acid esters of the class described. Thus, the synthetic rubber-like masses which may be softened with one of these esters may be those resulting from the polymerization of 1,3-butadiene with acrylonitrile where these materials constitute the sole polymerizable reactants or they may be those from the polymerization of the same with other polymerizable materials of the kind described herein.

Mixtures of a natural rubber with one or more synthetic rubber-like masses of the kind described above also may be obtained in a softened condition with one of the phthalic acid ester softening agents. Also, natural rubbers themselves may be plasticized by milling with a relatively small amount of one of the esters, e. g., about 1-10% on the weight of the rubber.

Where mechanical mixtures of the synthetic rubber-like copolymers either with each other or with a natural rubber are desired in a softened condition, such mixtures are preferably to be obtained by first milling the tougher of the materials with one of the ester softening agents so as to bring the same to a condition of softness approximating that of the softer component, e. g., natural rubber, followed by working in of the latter. If desired, the combined rubber materials may be milled with additional amounts of the ester softening agent.

While I have more particularly described my invention with respect to the application of the phthalic acid esters to the synthetic rubber-like copolymers in the dry condition, they may also be applied to the copolymers in the wet condition. The ester may be mixed with the initial reactants before the polymerization reaction or, as is preferable in order to avoid the possibility of poisoning or inhibiting the polymerization reaction by the presence of the ester, the softening agent in emulsified form may be mixed with the latex from the polymerization before coagulation. In the latter case, the softening agent is preferably emulsified with the same type of emulsifier or dispersing agent, i. e. acidic or basic, as was employed for obtaining the latex emulsion. In either instance the ester-containing copolymer after coagulation and drying may be milled to develop varying degrees of softness therein.

The softened synthetic rubber-like copolymers or mixtures thereof with each other or with natural rubber may be compounded and vulcanized similarly as can natural rubber, as will be understood by those skilled in the art.

Since suitable modifications and changes may be made in the invention without departing from the spirit and scope thereof, the foregoing description is intended by way of illustration except as may be defined in the following claims.

I claim:

1. A rubber-like plastic mass comprising a rubber-like product of the polymerization of 1,3-butadiene with a polymerizable material comprising acrylonitrile mixed with a mixed ester of the general formula $$R[XY]_n$$

wherein R is the residue of a polyhydric alcohol selected from the group consisting of alkylene glycols containing from 2-4 carbon atoms, polyalkylene glycols containing from 4-8 carbon atoms and glycerol, X is the residue of phthalic acid, Y is an alkyl group containing not more than 8 carbon atoms, and $n$ is an integer equal to the member of hydroxyl groups in the polyhydric alcohol of which R is the residue.

2. A rubber-like plastic mass comprising a rubber-like polymerization product of 1,3-butadiene and acrylonitrile mixed with a mixed ester of the general formula $$R[XY]_n$$

wherein R is the residue of a polyhydric alcohol selected from the group consisting of alkylene glycols containing from 2-4 carbon atoms, polyalkylene glycols containing from 4-8 carbon atoms and glycerol, X is the residue of phthalic acid, Y is an alkyl group containing not more than 8 carbon atoms, and $n$ is an integer equal to the member of hydroxyl groups in the polyhydric alcohol of which R is the residue.

3. A rubber-like plastic mass comprising a rubber-like polymerization product of 1,3-butadiene and acrylonitrile mixed with dibutyl ethylene glycol diphthalate.

4. A rubber-like plastic mass comprising a rubber-like polymerization product of 1,3-butadiene and acrylonitrile mixed with dibutyl diethylene glycol diphthalate.

5. A rubber-like plastic mass comprising a rubber-like polymerization product of 1,3-butadiene and acrylonitrile mixed with tributyl glycerol triphthalate.

6. A vulcanizate obtained from a vulcanizable mix comprising a rubber-like plastic mass as set forth in claim 1.

7. A vulcanizate obtained from a vulcanizable mix comprising a rubber-like plastic mass as set forth in claim 2.

8. A vulcanizate obtained from a vulcanizable mix comprising a rubber-like plastic mass as set forth in claim 3.

9. A vulcanizate obtained from a vulcanizable mix comprising a rubber-like plastic mass as set forth in claim 4.

10. A vulcanizate obtained from a vulcanizable mix comprising a rubber-like plastic mass as set forth in claim 5.

11. A process of softening a rubber-like product of the polymerization of 1,3-butadiene with a polymerizable material comprising acrylonitrile which comprises mixing therewith a mixed ester of the general formula $$R[XY]_n$$

in which R is the residue of a polyhydric alcohol selected from the group consisting of alkylene glycols containing from 2-4 carbon atoms, polyalkylene glycols containing from 4-8 carbon atoms and glycerol, X is the residue of phthalic acid, Y is an alkyl group containing not more than 8 carbon atoms and $n$ is an integer equal to the member of hydroxyl groups in the polyhydric alcohol of which R is the residue.

12. A process of softening a rubber-like polymerization product of 1,3-butadiene and acrylonitrile which comprises mixing therewith a mixed ester of the general formula $$R[XY]_n$$

in which R is the residue of a polyhydric alcohol selected from the group consisting of alkylene glycols containing from 2-4 carbon atoms, polyalkylene glycols containing from 4-8 carbon atoms and glycerol, X is the residue of phthalic acid, Y is an alkyl group containing not more than 8 carbon atoms and $n$ is an integer equal to the member of hydroxyl groups in the polyhydric alcohol of which R is the residue.

13. A process of softening a rubber-like polymerization product of 1,3-butadiene and acrylonitrile which comprises mixing therewith dibutyl ethylene glycol diphthalate.

14. A process of softening a rubber-like polymerization product of 1,3-butadiene and acrylonitrile which comprises mixing therewith dibutyl diethylene glycol diphthalate.

15. A process of softening a rubber-like polymerization product of 1,3-butadiene and acrylonitrile which comprises mixing therewith tributyl glycerol triphthalate.

ARNOLD R. DAVIS.